United States Patent
Blasco Allue et al.

(10) Patent No.: US 7,251,751 B2
(45) Date of Patent: Jul. 31, 2007

(54) DIAGNOSTIC MECHANISMS WITHIN MULTI PROCESSING SYSTEMS

(75) Inventors: Conrado Blasco Allue, Austin, TX (US); Paul Kimelman, Alamo, CA (US); Andrew Brookfield Swaine, Cambridge (GB); Michael John Williams, Cambridge (GB)

(73) Assignee: Arm Limited, Cambridge (GB)

( * ) Notice: Subject to any disclaimer, the term of this patent is extended or adjusted under 35 U.S.C. 154(b) by 501 days.

(21) Appl. No.: 10/801,132

(22) Filed: Mar. 16, 2004

(65) Prior Publication Data

US 2005/0210327 A1   Sep. 22, 2005

(51) Int. Cl.
G06F 11/00   (2006.01)
(52) U.S. Cl. ...................................................... 714/25
(58) Field of Classification Search ............... 714/25, 714/27, 30, 48, 47
See application file for complete search history.

(56) References Cited

U.S. PATENT DOCUMENTS

| 5,408,408 | A  | * | 4/1995  | Marsico, Jr. ............... 700/91 |
| 5,642,478 | A  | * | 6/1997  | Chen et al. ................ 714/45 |
| 6,772,369 | B2 | * | 8/2004  | Smith et al. .............. 714/31 |
| 6,964,001 | B2 | * | 11/2005 | Dervisoglu et al. ........ 714/726 |
| 2003/0033559 | A1 | * | 2/2003 | Williams ................... 714/39 |
| 2005/0027897 | A1 | * | 2/2005 | Fellenser et al. ............ 710/15 |
| 2005/0033553 | A1 | * | 2/2005 | Swaine et al. ............. 702/176 |

* cited by examiner

Primary Examiner—Nadeem Iqbal
(74) Attorney, Agent, or Firm—Nixon & Vanderhye P.C.

(57) ABSTRACT

Within a system-on-chip device 2 having multiple processing circuits 4, 6, 8, one processing circuit 4 may serve to perform diagnostic operations upon another processing circuit 8 by accessing diagnostic data relating to that other circuit. Thus, one processor may, for example, control and perform halting mode type diagnostic or code profiling upon another.

29 Claims, 4 Drawing Sheets

Halting Mode Diagnosis

DIAGNOSTIC MECHANISMS WITHIN MULTI PROCESSING SYSTEMS

BACKGROUND OF THE INVENTION

1. Field of the Invention

This invention relates to the field of data processing systems. More particularly, this invention relates to diagnostic mechanisms useful in performing diagnostic operations upon multi-processing systems.

2. Description of the Prior Art

It is known to provide integrated circuits including more than one processor for performing data processing operations all combined within a single integrated circuit. Combining processors in this way reduces cost, reduces power consumption and increases speed. Such highly integrated designs are sometimes referred to as system-on-chip integrated circuits. The processors can take a wide variety of different forms such as general purpose processors, DSP elements, data engines and the like.

When such complex, highly integrated systems are produced there is a strong need for efficient diagnostic mechanism such that bugs within their design and operation can be quickly and effectively identified and such that analysis (profiling) of the software can be carried out. The provision of multiple processing circuits within a single integrated circuit makes such diagnostic operations more difficult due to the increase in complexity whilst maintaining the low package pin count which it is normally desired to dedicate to diagnostic operations.

One known approach to the diagnosis of such systems is to employ serial scan chains to scan diagnostic data into and out of the integrated circuit and through the various processors and processing elements within the integrated circuit. With complex multi-processor systems such scan chains will accordingly become long and this, coupled with the relatively slow speeds at which it is possible to serially scan using such external debugging mechanisms, results in difficulty in rapidly and efficiently performing diagnostic operations upon such integrated circuits. These problems are generally increasing as the complexity and number of processors and processing circuits within integrated circuits steadily increases and the normal operation speeds of those integrated circuits increase whilst the diagnostic capabilities and diagnostic speeds of serial scan chains remain relatively limited. The overhead of a required protocol translator is also a disadvantage.

It is also possible within a multiprocessor system running a distributed operating system that one processor executing a debug thread may send the operating system a request to have another processor provide some diagnostic data regarding its own operation. This requires disadvantageous operating system support and is also intrusive upon normal operation.

SUMMARY OF THE INVENTION

Viewed from one aspect the present invention provides an integrated circuit comprising:

a data processing circuit operable to perform data processing operations;

a processor operable to perform data processing operations under program instruction control; and a diagnostic circuit coupled to said data processing circuit and operable to capture diagnostic data relating to said data processing circuit; wherein said processor is also coupled to said diagnostic circuit and is operable to access said diagnostic data said relating to said data processing circuit independently of said data processing circuit.

The present technique recognizes that within an integrated circuit it is possible to use a programmable processor which is provided for operational use to in fact perform diagnostic operations upon another data processing circuit within that integrated circuit if the programmable processor is given access to diagnostic data relating to the data processing circuit being subject to investigation. Thus, whilst the data processing circuit under investigation may, for example, be halted to provide halting mode debug, have taken an exception to provide monitor mode debug, or have been subject to code profiling diagnostic data capture whilst still executing program instructions, the processor being used to perform the diagnostic operations remains active and queries the captured diagnostic data on-chip using high speed and efficient communication mechanisms.

The halting of the data processing circuit being diagnosed is a beneficial diagnosis technique since it may be triggered and managed by the diagnostic circuit hardware in a manner which produces less alteration to the data processing circuit being investigated and accordingly tends to give more accurate diagnostic results. The halting mechanism does however require processing by the data processing circuit being diagnosed to be stopped and this can preclude certain real time investigations.

Code profiling operation allows one processor within the integrated circuit to perform code profiling upon another processor within the integrated circuit. Since this code profiling is performed on-chip, it is easier to perform more rapidly giving higher resolution code profiling results, which can dramatically increase the usefulness of such code profiling data. It will be appreciated that diagnostic code profiling data can take a wide variety of different forms. As examples, such diagnostic code profiling data may include captured program counter values, process ID values, condition code pass data, information identifying the occurrence of exception events, cache hit data, processor mode data, security mode information and other data relating to code execution. The code profiling data could be used to control operational parameters of the integrated circuit, e.g. voltage level, clock speed etc., to better match the software behavior.

Monitor mode debug can be used as an alternative to halting mode debug in systems with strict real-time requirements where it is not acceptable to step execution completely. In these systems it is advantageous that only the task being diagnosed is suspended, e.g. in a hard-drive system where it is desired to debug some code but allow the fast interrupt to keep being serviced, as it controls the engine; if the engine steps when the hard drive heads are not marked, then the disk may be damaged.

As well as debugging the data processing circuit on-chip, the processor accessing the captured diagnostic data relating to the data processing circuit may also control output of that diagnostic data using the communication mechanisms normally provided for operational purposes and optionally pre-process the captured diagnostic prior to output or other use (e.g. compress or transform to a higher level representation). Thus, high speed diagnostic data output may be supported without requiring dedicated diagnostic data pins.

A further advantage of not requiring a dedicated diagnostic interface (e.g. JTAG) is that it may not be necessary to use a custom device (i.e. protocol translator) for communication between a development system (e.g. a workstation running a debugger) with this diagnostic interface.

The diagnostic circuit coupled to the data processing circuit under investigation may be programmable to perform a variety of different investigations and the control of this diagnostic circuit may be performed by the on-chip processor specifying diagnostic operations which the diagnostic circuit is to carry out.

It is convenient within such integrated circuits that the data processing circuit and the processor communicate during non-diagnostic operation via a system bus and during diagnostic operation via a diagnostic bus. A bus bridge may advantageously be provided between the system bus and the diagnostic bus via which communication can occur during diagnostic operation if desired.

It is convenient to provide the processor with access to the diagnostic data relating to the data processing circuit under investigation by providing such diagnostic data within memory mapped storage locations which are accessible to the processor. Typically the storage locations will form part of the physical memory associated with the integrated circuit but may instead be special purpose diagnostic registers which happen to be addressed using memory mapped locations.

It will be appreciated that the diagnostic capabilities provided by the processor for the data processing circuit may also be reversed within such multi-processing systems such that the data processing circuit can also be used to perform diagnostic operations upon the processor. This can be considered to be diagnostic reciprocity.

External communication of diagnostic data may be enhanced by use of a peripheral device communication circuit normally provided for non-diagnostic operation, such as an operational Ethernet peripheral device.

By way of a complementary communication channel, or in circumstances where a suitable operational communication peripheral does not exist, the bus bridge may be coupled to a diagnostic interface to provide external communication.

As previously mentioned, the processing elements to be diagnosed within the integrated circuit can take a wide variety of different forms, such as programmable general purpose processors, dedicated DSP processors, microcoded processors, hardware controlled type finite state machines and the like. The technique is particularly well suited to situations in which the data processing circuit being diagnosed is a further processor performing program control processing operations since these often require complex debugging.

The diagnostic data may be pre-processed or used in other ways by the processor rather than simply being relayed off-chip.

Viewed from a further aspect the present invention provides a method of obtaining diagnostic data for an integrated circuit comprising the steps of:

performing data processing operations with a data processing circuit within said integrated circuit;

performing data processing operations under program instruction control with a processor within said integrated circuit;

capturing with a diagnostic circuit coupled to said data processing circuit and within said integrated circuit diagnostic data relating to said data processing circuit; and accessing said diagnostic data said relating to said data processing circuit with said processor and independently of said data processing circuit.

Another aspect of the invention is a computer program for controlling a processor to obtain diagnostic data relating to an integrated circuit in accordance with the above techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
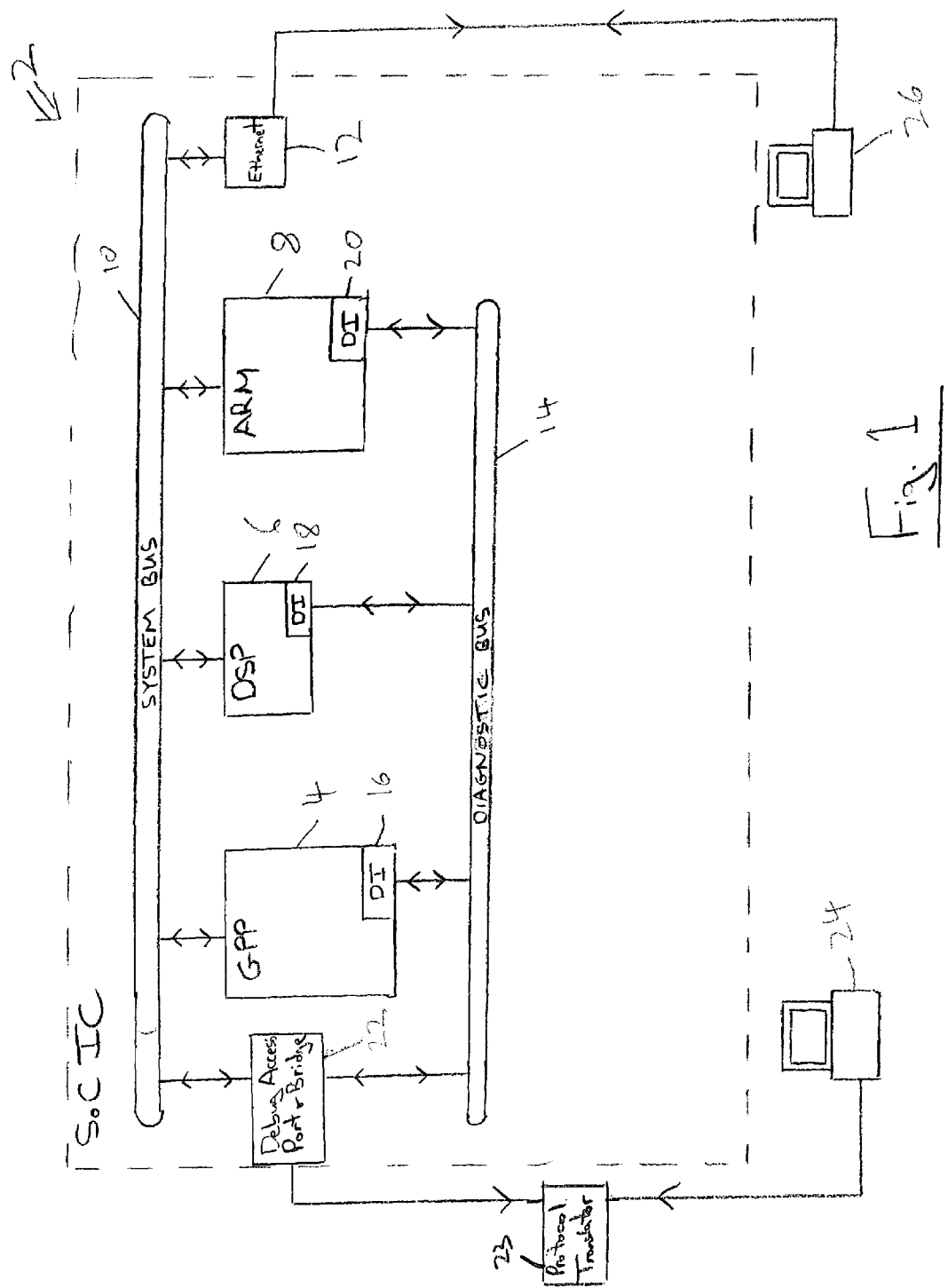
FIG. 1 schematically illustrates an integrated circuit including multiple data processing elements.

FIG. 1 schematically illustrates an integrated circuit 2 of a system-on-chip nature including a first general purpose processor 4, a DSP processor 6 and a second general purpose processor 8 coupled via a system bus 10 to perform non-diagnostic operations including external communication via an Ethernet peripheral circuit 12. A diagnostic bus 14 is also provided between diagnostic circuits 16, 18, 20 associated with respective ones of each of the first processor 4, the DSP processor 6 and the second processor 8. A bus bridge and diagnostic access port 22 is provided between the diagnostic bus 14 and the system bus 10 and also provides external communication via a protocol translator 23 to an external diagnostic device 24. The protocol translator 23 is not required in some preferred embodiments relying on other in-built communications mechanisms.

The diagnostic circuits 16, 18, 20 are operable to perform diagnostic operations upon their associated operational circuits 4, 6, 8, such as triggering halting mode debugging, capturing code profiling data and the like. The diagnostic data captured by these diagnostic circuits 16, 18, 20 and the control of these diagnostic circuits 16, 18, 20 may be achieved using storage locations, such as registers, located within the diagnostic circuits 16, 18, 20 themselves, within their associated circuits being diagnosed, namely processing circuits 4, 6, 8, or elsewhere. These diagnostic data and operation storage locations are memory mapped locations such that they can be accessed by the programmable processors 4, 8 via the system bus 10, the bus bridge 22 and the diagnostic bus 14. Accordingly, diagnostic program code running on one of the processors 4, 8 can control diagnostic operations being performed on another of the processing elements 4, 6, 8 within the system-on-chip integrated circuit 2 and also access captured diagnostic data relating to that other processing element. The diagnostic data captured or commands to be received may be communicated with an external diagnostic device 26 via the system bus and the Ethernet peripheral communication circuit 12.

Figure 2:
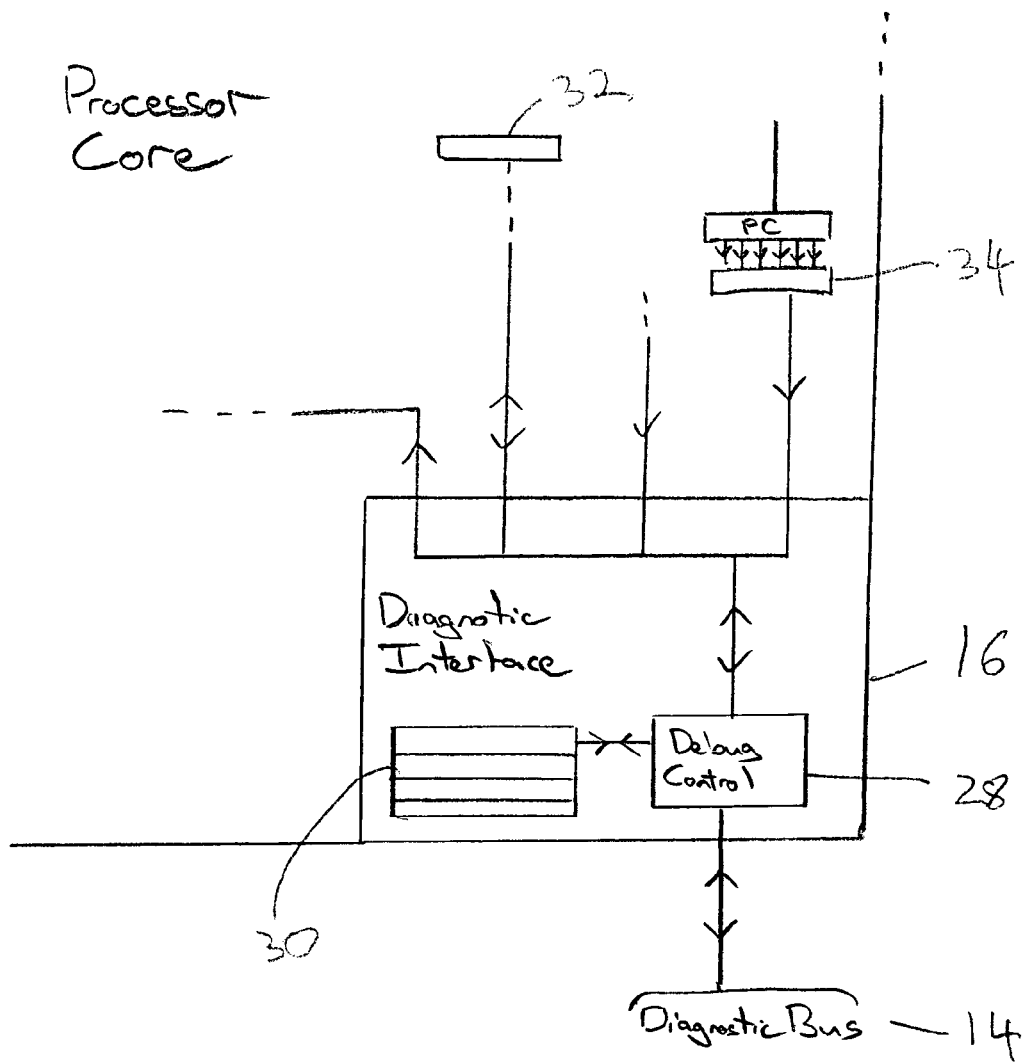
FIG. 2 schematically illustrates a diagnostic circuit associated with a processor core.

FIG. 2 illustrates a diagnostic circuit 16 in more detail. This is coupled to the diagnostic bus 14 and includes a diagnostic control circuit 28. Within the diagnostic circuit 16 are storage locations 30 for storing diagnostic data and diagnostic control parameters. Diagnostic storage may also be provided within registers 32 located within the data processing circuit under investigation itself. These diagnostic registers may include a register 34 for capturing instantaneous program counter PC values for the purpose of code profiling. Instantaneous capture may also be provided of other information such as condition code pass information, exception event occurrence, cache hit data, process ID, processor mode, security mode and the like.

Figure 3:
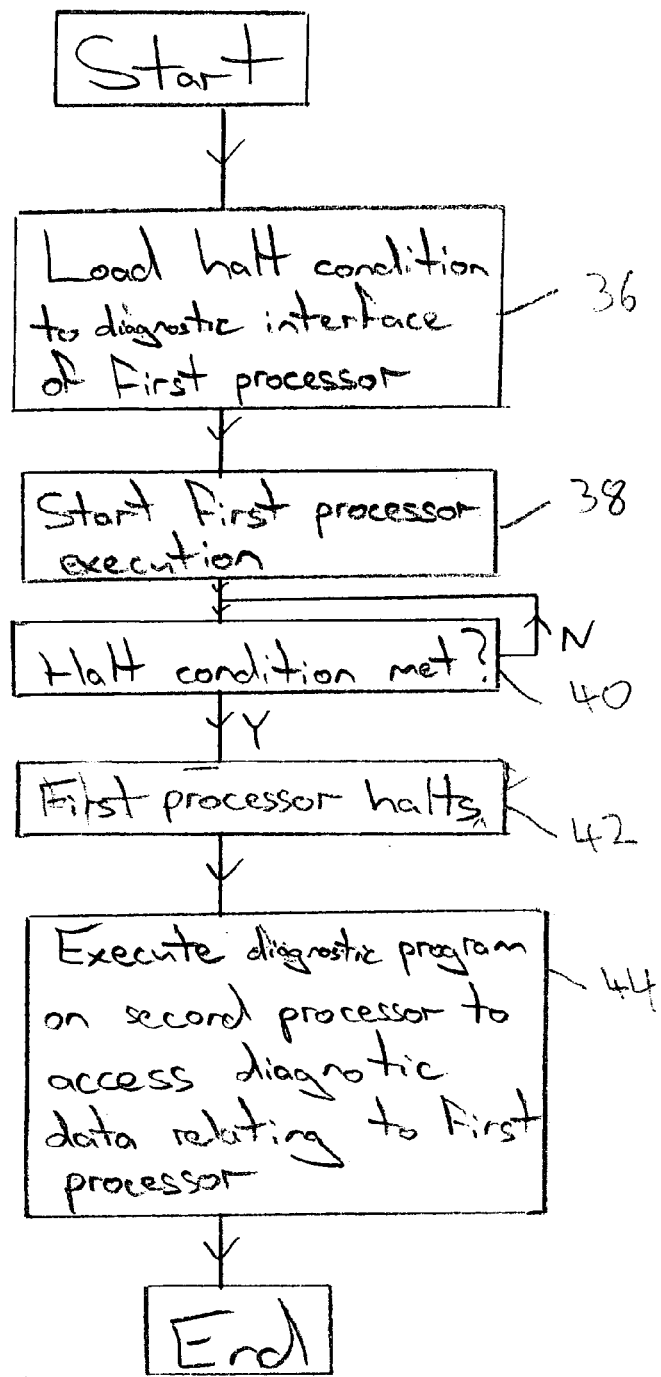
FIG. 3 is a flow diagram illustrating halting mode debugging of one processor by another processor.

FIG. 3 is a flow diagram schematically illustrating halting mode debug. At step 36 a diagnostic circuit 16 is configured to specify a halt condition in which it is to halt processing being performed by a first processor. At step 38 the processing by that first processor is then started and proceeds until the halt condition is detected at step 40. When the halt condition is detected, the first processor halts at step 42 and then processing proceeds to step 44 at which a diagnostic program (which may be separately supplied and can also be considered to be a complementary aspect of the invention) on a second processor is executed to access diagnostic data relating to the halted first processor.

As an alternative, the detection at step 40 could trigger an exception to be taken and a monitor mode debug handler to start execution upon the first processor to provide monitor mode debugging.

Figure 4:
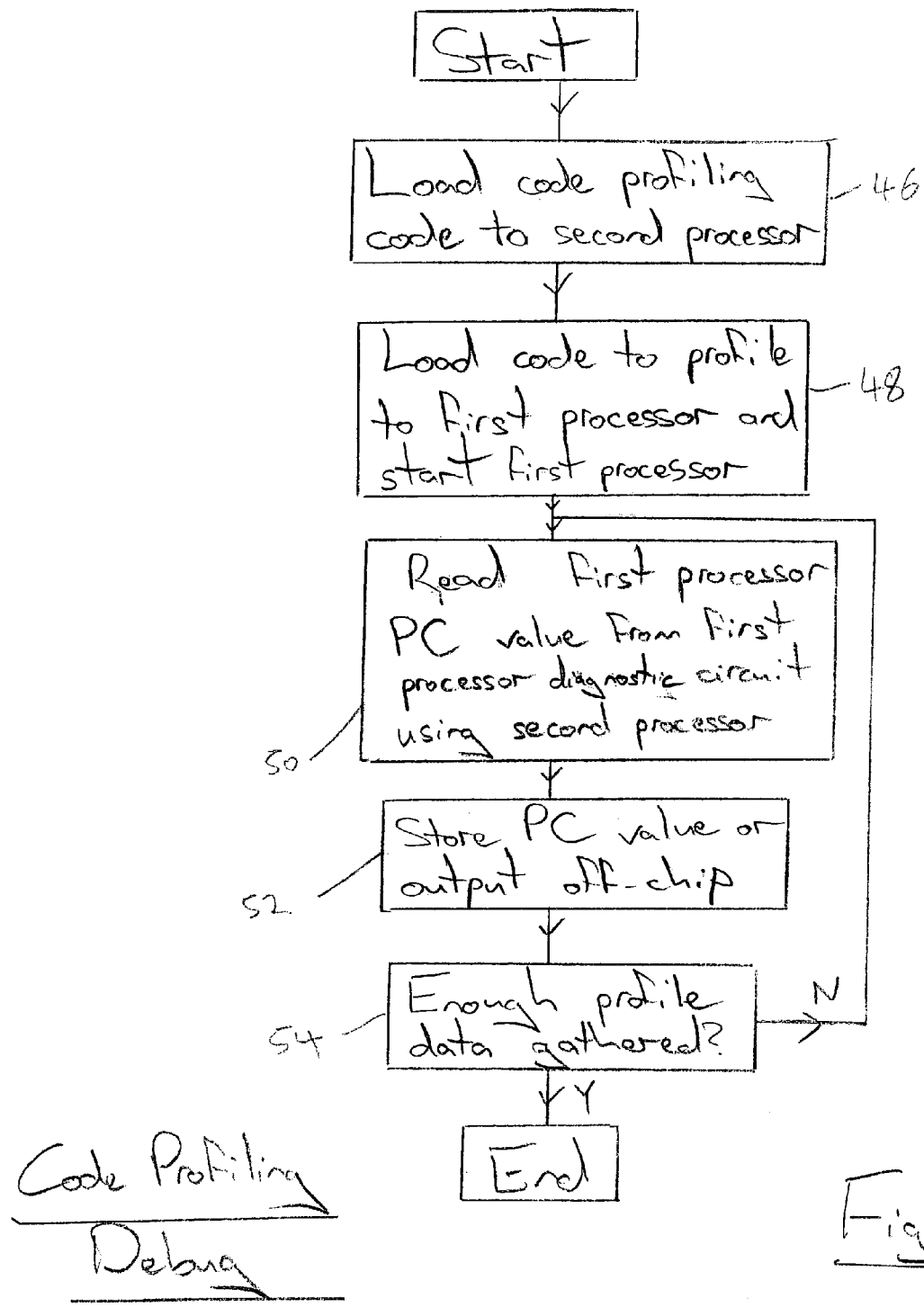
FIG. 4 is a flow diagram illustrating code profiling of one processor by another processor.

FIG. 4 is a flow diagram illustrating code profiling diagnostic operation. At step 46, code profiling program code (which may be separately supplied and can also be considered to be a complementary aspect of the invention) is loaded into a second processor to control code profiling which is to be performed in relation to a first processor. At step 48 the program code which is to be profiled is loaded into the first processor. This program code may be substantially unaltered from its fully operational form in a manner which improves the authenticity of the diagnostic information obtained.

In this example the code profiling being performed is to repeatedly sample the program counter PC value existing within the first processor at a sequence of times. Step 50 provides for the second processor operating under its own program control to read the first processor program counter value via the diagnostic data access mechanisms provided by the integrated circuit of FIG. 1. In particular, the register 34 illustrated in FIG. 2 may be memory mapped and accessed via the system bus 10, the bus bridge 22 and the diagnostic bus 14. The program counter PC value thus captured may be stored off-chip at step 52 using the system bus 10 and the Ethernet peripheral communication circuit 12 to reach the external diagnostic device 26. Step 54 determines when enough profiling data has been gathered and selectively returns processing to step 50.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
    a data processing circuit configured to perform data processing operations;
    a processor, responsive to program instructions, for performing non-diagnostic data processing operations under program instruction control; and
    a diagnostic circuit coupled to said data processing circuit and operable to capture diagnostic data relating to said data processing circuit;
    wherein said processor is also coupled to said diagnostic circuit and is responsive to program instructions to perform diagnostic data processin operations including accessing said diagnostic data relating to said data processing circuit independently of said data processing circuit.

2. An integrated circuit as claimed in claim 1, wherein said diagnostic circuit is configured upon detecting predetermined conditions to halt data processing by said data processing circuit to provide halting mode debug.

3. An integrated circuit as claimed in claim 1, wherein said diagnostic circuit is configured to capture diagnostic code profiling data relating to program instructions being executed by said data processing circuit whilst said data processing circuit continues to execute program instructions.

4. An integrated circuit as claimed in claim 1, wherein said diagnostic circuit is configured upon detecting predetermined conditions to trigger said data processing circuit to execute an exception handling program to provide monitor mode debug.

5. An integrated circuit as claimed in claim 1, wherein said processor is configured to control output of said diagnostic data relating to said data processing circuit from said integrated circuit.

6. An integrated circuit as claimed in claim 1, wherein said processor is configured to control said diagnostic circuit to perform diagnostic operations upon said data processing circuit.

7. An integrated circuit as claimed in claim 1, wherein said data processing circuit and said processor are configured to communicate during non-diagnostic operation via a system bus.

8. An integrated circuit as claimed in claim 1, wherein said data processing circuit and said processor are configured to communicate during diagnostic operation via a diagnostic bus.

9. An integrated circuit as claimed in claim 7, comprising a bus bridge between said system bus and a diagnostic bus, said data processing circuit and said processor are configured to communicate during diagnostic operation via said system bus, said bus bridge and said diagnostic bus.

10. An integrated circuit as claimed in claim 1, wherein said diagnostic circuit is configured to store said diagnostic data relating to said data processing circuit within memory mapped storage locations accessible by said processor.

11. An integrated circuit as claimed in claim 1, comprising: a processor diagnostic circuit coupled to said processor and configured upon detecting predetermined conditions to halt program instruction execution by said processor and capture diagnostic data relating to said processor; wherein said data processing circuit is also coupled to said processor diagnostic circuit and is configured to access said diagnostic data said relating to said processor.

12. An integrated circuit as claimed in claim 1, comprising a peripheral device communication circuit configured during non-diagnostic operation of said integrated circuit to provide data communication with an external operational device coupled to said integrated circuit, said peripheral device communication circuit being useable by said processor during diagnostic operation to communicate at least one of said diagnostic data relating to said data processing circuit, diagnostic operations and pre-processed diagnostic data with an external diagnostic device.

13. An integrated circuit as claimed in claim 9, wherein said bus bridge is coupled via a diagnostic interface to an external diagnostic device.

14. An integrated circuit as claimed in claim 1, wherein said data processing circuit is a further processor configured to perform data processing operations under program instruction control.

15. A method of obtaining diagnostic data for an integrated circuit comprising the steps of:
performing data processing operations with a data processing circuit within said integrated circuit;
performing non-diagnostic data processing operations under program instruction control with a processor within said integrated circuit;
capturing with a diagnostic circuit coupled to said data processing circuit and within said integrated circuit diagnostic data relating to said data processing circuit; and
performing diagnostic data processing operations with said processor under program instruction control including accessing said diagnostic data said relating to said data processing circuit with said processor and independently of said data processing circuit.

16. A method as claimed in claim 15, wherein said diagnostic circuit, upon detecting predetermined conditions, halts data processing by said data processing circuit to provide halting mode debug.

17. A method as claimed in claim 15, wherein said diagnostic circuit captures diagnostic code profiling data relating to program instructions being executed by said data processing circuit whilst said data processing circuit continues to execute program instructions.

18. A method as claimed in claim 15, wherein said diagnostic circuit, upon detecting predetermined conditions, triggers said data processing circuit to execute an exception handling program to provide monitor mode debug.

19. A method as claimed in claim 15, wherein said processor controls output of said diagnostic data relating to said data processing circuit from said integrated circuit.

20. A method as claimed in claim 15, wherein said processor controls said diagnostic circuit to perform diagnostic operations upon said data processing circuit.

21. A method as claimed in claim 15, wherein said data processing circuit and said processor communicate during non-diagnostic operation via a system bus.

22. A method as claimed in claim 15, wherein said data processing circuit and said processor communicate during diagnostic operation via a diagnostic bus.

23. A method as claimed in claim 21, wherein said data processing circuit and said processor communicate during diagnostic operation via said system bus, a bus bridge and a diagnostic bus.

24. A method as claimed in claim 15, wherein said diagnostic circuit stores said diagnostic data relating to said data processing circuit within memory mapped storage locations accessible by said processor.

25. A method as claimed in claim 15, wherein:
a processor diagnostic circuit is coupled to said processor and upon detecting predetermined conditions halts program instruction execution by said processor and to capture diagnostic data relating to said processor; and
said data processing circuit is also coupled to said processor diagnostic circuit and accesses said diagnostic data said relating to said processor.

26. A method as claimed in claim 15, wherein a peripheral device communication circuit, during non-diagnostic operation of said integrated circuit, provides data communication with an external operational device coupled to said integrated circuit, said peripheral device communication circuit being used by said processor during diagnostic operation to communicate at least one of said diagnostic data relating to said data processing circuit, diagnostic operations and preprocessed diagnostic data with an external diagnostic device.

27. A method as claimed in claim 23, wherein said bus bridge is coupled via a diagnostic interface to an external diagnostic device.

28. A method as claimed in claim 15, wherein said data processing circuit is a further processor performing data processing operations under program instruction control.

29. A computer program product embodied on a computer-readable medium having a computer program operable to control a processor to obtain diagnostic data for an integrated circuit in accordance with the method of claim 15.

* * * * *